United States Patent Office.

JOHN JAMES LUNDY, OF LEITH, NEAR EDINBURGH, NORTH BRITAIN.

Letters Patent No. 112,728, dated March 14, 1871.

IMPROVEMENT IN COMPOUNDS FOR LUBRICATING WOOL.

The Schedule referred to in these Letters Patent and making part of the same.

I, JOHN JAMES LUNDY, of Leith, near Edinburgh, in the county of Midlothian, North Britain, color, paint, varnish, grease, and chemical manufacturer, have invented an Improved Compound for the Lubrication of Wool and other similar animal material in their processes of manufacture, and in preventing and arresting the combustion of such materials, of which the following is a specification.

This invention relates to improvements in the production and use of an improved compound or compounds for the lubrication of wool and of other similar animal material during their processes of manufacture, and for preventing and arresting the combustion thereof; and consists—

First, in the manufacture and use of a mixture or emulsion made by adding Gallipoli or olive oil, recovered-wool oil, or other suitable oil or oils, to a solution of caustic alkali, soda ash or potash, or one or more of them, in water, and incorporating the same therewith; and Secondly, to the employment, separately or in conjunction with the before-mentioned or other lubricants, of solutions of such salt, salts, or compounds as shall possess the power of preventing or arresting the effects of fire arising from spontaneous combustion or otherwise.

In carrying out the first part of my invention, I make a mixture or emulsion by adding olive or other suitable oil or oils to a solution of soda ash or potash in a similar manner to that hereinafter described for using caustic soda; but I employ, by preference, a mixture or emulsion made by adding about one pint of a solution of a hydrated oxide of sodium, (NaO or NaO HO,) commonly known as caustic soda, marking for example about 69° Twaddel, or a specific gravity of about 1.345 to about ten gallons of water, to which solution is then added and thoroughly incorporated and mixed about one gallon of olive or other suitable oil or oils, in order that a mixture or emulsion may be obtained, which mixture or emulsion may be employed for the purposes hereinbefore mentioned by being sprinkled or otherwise upon the wool or other animal fiber previous to being submitted to the Willeying-machine, or before being carded and spun, in a manner similar to that now adopted when oil, or oil and water, or other lubricants are employed, as is well unstood.

My invention further relates to the employment, separately or in conjunction with, or the application before or after, the before-mentioned compound, emulsion or mixture, or other lubricants or compounds, of a solution of salt, salts, or compounds as have the power of arresting or preventing the injurious effects of fire arising either from spontaneous combustion or otherwise, as, for example, tungstate of soda, phosphate of soda, chloride of magnesium, or a solution of one or more of them, or of any other fire-arresting salt, salts, or compounds separately or combined, with which the materials under treatment may be sprinkled, tempered, or moistened.

In carrying out this second part of my invention, the solution of tungstate of soda, phosphate of soda, chloride of magnesium, or a mixture of any of them, or of any other suitable salt or salts or compounds may be sprinkled or otherwise applied to the wool either before or after the application of oil, oil and water, the emulsion before described, or of any other lubricant, or they may be mixed therewith previous to application to the wool or other animal fiber; but I find a good result from using a combined mixture, compound, or emulsion, by dissolving about one pound of phosphate of soda and seven pounds of tungstate of soda in forty gallons of water, to which I also add half a gallon of a solution of a hydrated oxide of sodium (NaO or NaO HO) commonly known as caustic soda, marking about 69° Twaddel, or a specific gravity of 1.345, and thereafter I add about four gallons of olive or other suitable oil or oils.

Although I have given the proportions which I have found to give good results, I do not limit myself to the same, as other proportions of caustic soda, soda ash, potash, water, fire-arresting salt, salts, or compounds, and oil or oils, may be employed.

Having thus described my invention and the manner in which the same is or may be carried into effect,

What I claim, and desire to secure by Letters Patent, is—

1. The manufacture or use of a mixture or emulsion produced by adding Gallipoli, olive, or other saponifiable oil to a solution in water of a caustic alkali, soda ash, or potash, or mixture thereof, and then incorporating the same therewith.

2. The employment, either separately or in conjunction with the before-mentioned or other lubricants, of solutions of tungstate or phosphate of soda, chloride of magnesium, or of such salts or compounds as shall possess the power of preventing or arresting the effects of fire arising from spontaneous combustion or otherwise.

In testimony whereof I have signed my name to this specification in the presence of two subscribing witnesses.

JOHN J. LUNDY.

Witnesses:
  H. BEATTIE,
    1 *Gordon Street, Leith.*
  THOS. HALL,
    8 *Smith's Place, Leith.*